US012322795B2

(12) United States Patent
Kido

(10) Patent No.: US 12,322,795 B2
(45) Date of Patent: Jun. 3, 2025

(54) LITHIUM ION SECONDARY BATTERY

(71) Applicant: TDK CORPORATION, Tokyo (JP)

(72) Inventor: Ryosuke Kido, Tokyo (JP)

(73) Assignee: TDK CORPORATION, Tokyo (JP)

( * ) Notice: Subject to any disclaimer, the term of this patent is extended or adjusted under 35 U.S.C. 154(b) by 567 days.

(21) Appl. No.: 17/723,785

(22) Filed: Apr. 19, 2022

(65) Prior Publication Data

US 2022/0384796 A1 Dec. 1, 2022

(30) Foreign Application Priority Data

May 26, 2021 (JP) ................. 2021-088276

(51) Int. Cl.
*H01M 4/48* (2010.01)
*H01M 4/02* (2006.01)
*H01M 4/13* (2010.01)
*H01M 4/36* (2006.01)
*H01M 10/0525* (2010.01)

(52) U.S. Cl.
CPC ............... *H01M 4/48* (2013.01); *H01M 4/13* (2013.01); *H01M 4/366* (2013.01); *H01M 2004/027* (2013.01); *H01M 10/0525* (2013.01)

(58) Field of Classification Search
None
See application file for complete search history.

(56) References Cited

U.S. PATENT DOCUMENTS

| 6,010,806 | A | 1/2000 | Yokoyama et al. |
| 6,210,835 | B1 | 4/2001 | Arai |
| 6,495,293 | B1 | 12/2002 | Arai et al. |
| 6,927,001 | B1 | 8/2005 | Hamamoto et al. |
| 12,206,072 | B2* | 1/2025 | Sadakane ............. H01M 4/661 |
| 2002/0037458 | A1 | 3/2002 | Yamaguchi et al. |
| 2002/0081496 | A1 | 6/2002 | Tsujioka et al. |
| 2003/0175598 | A1 | 9/2003 | Otsuki et al. |
| 2003/0180608 | A1 | 9/2003 | Mori et al. |
| 2003/0180618 | A1 | 9/2003 | Inoue et al. |
| 2003/0224242 | A1 | 12/2003 | Kaito et al. |
| 2004/0009393 | A1 | 1/2004 | Kim et al. |
| 2004/0038133 | A1 | 2/2004 | Yamaguchi et al. |
| 2004/0043300 | A1 | 3/2004 | Utsugi et al. |
| 2004/0091786 | A1 | 5/2004 | Unoki et al. |
| 2004/0170903 | A1 | 9/2004 | Fukuoka et al. |
| 2004/0259000 | A1 | 12/2004 | Adachi et al. |
| 2005/0014072 | A1 | 1/2005 | Yamaguchi et al. |

(Continued)

FOREIGN PATENT DOCUMENTS

| EP | 2120279 A1 | 11/2009 |
| EP | 2475041 A1 | 7/2012 |

(Continued)

*Primary Examiner* — Kevin M Bernatz
(74) *Attorney, Agent, or Firm* — Oliff PLC

(57) ABSTRACT

A lithium ion secondary battery includes: a positive electrode, a negative electrode, a separator located between the positive electrode and the negative electrode, and an electrolytic solution. The negative electrode includes a negative electrode active material which contains silicon oxide and a compound containing a first element. The electrolytic solution contains an imide salt which contains the first element and an imide anion. The first element is any one or more elements selected from the group consisting of K, Na, Mg, Ca, Cs, Al, and Zn.

7 Claims, 2 Drawing Sheets

(56) References Cited

U.S. PATENT DOCUMENTS

| | | | |
|---|---|---|---|
| 2005/0081370 A1* | 4/2005 | Kurihara | H01G 11/52 |
| | | | 29/623.5 |
| 2005/0277027 A1 | 12/2005 | Kim et al. | |
| 2007/0015063 A1 | 1/2007 | Ogawa et al. | |
| 2007/0072084 A1 | 3/2007 | Nishie | |
| 2007/0092803 A1 | 4/2007 | Nakanishi et al. | |
| 2007/0196736 A1 | 8/2007 | Takahashi et al. | |
| 2007/0202406 A1 | 8/2007 | Takahashi et al. | |
| 2007/0212615 A1 | 9/2007 | Jost et al. | |
| 2008/0020285 A1 | 1/2008 | Horikawa | |
| 2008/0145763 A1 | 6/2008 | Koh et al. | |
| 2008/0241704 A1 | 10/2008 | Abe et al. | |
| 2009/0023074 A1 | 1/2009 | Matsui et al. | |
| 2009/0053598 A1 | 2/2009 | Abe et al. | |
| 2009/0086408 A1 | 4/2009 | Koh et al. | |
| 2009/0111030 A1 | 4/2009 | Hojo et al. | |
| 2009/0130567 A1 | 5/2009 | Segawa | |
| 2009/0155686 A1 | 6/2009 | Takezawa | |
| 2009/0226808 A1 | 9/2009 | Hiwara et al. | |
| 2009/0246631 A1 | 10/2009 | Hojo et al. | |
| 2009/0291370 A1 | 11/2009 | Kim et al. | |
| 2009/0311611 A1 | 12/2009 | Wu et al. | |
| 2009/0325076 A1 | 12/2009 | Matsui et al. | |
| 2010/0018034 A1 | 1/2010 | Miyasaka et al. | |
| 2010/0062344 A1 | 3/2010 | Koh et al. | |
| 2010/0124708 A1 | 5/2010 | Matsui et al. | |
| 2010/0159334 A1 | 6/2010 | Kashima et al. | |
| 2010/0209778 A1 | 8/2010 | Jouanneau-Si Larbi et al. | |
| 2011/0008681 A1 | 1/2011 | Koh et al. | |
| 2011/0081583 A1 | 4/2011 | Sugimoto et al. | |
| 2011/0091767 A1 | 4/2011 | Hojo et al. | |
| 2011/0123871 A1 | 5/2011 | Nakagawa et al. | |
| 2011/0236765 A1 | 9/2011 | Matsui et al. | |
| 2011/0274982 A1 | 11/2011 | Kaneko et al. | |
| 2012/0002349 A1 | 1/2012 | Ito et al. | |
| 2012/0009480 A1 | 1/2012 | Ohashi et al. | |
| 2012/0129035 A1 | 5/2012 | Takahata et al. | |
| 2012/0129055 A1 | 5/2012 | Takahata et al. | |
| 2012/0156555 A1 | 6/2012 | Hojo et al. | |
| 2012/0156572 A1 | 6/2012 | Hojo et al. | |
| 2012/0164519 A1 | 6/2012 | Lee et al. | |
| 2013/0004836 A1 | 1/2013 | Otsuka et al. | |
| 2013/0034774 A1 | 2/2013 | Yoshida et al. | |
| 2013/0052543 A1 | 2/2013 | Ihara et al. | |
| 2013/0078511 A1 | 3/2013 | Ikeda et al. | |
| 2014/0045002 A1 | 2/2014 | Yokoyama et al. | |
| 2014/0065490 A1 | 3/2014 | Otsuka et al. | |
| 2014/0154591 A1 | 6/2014 | Yokotsuji et al. | |
| 2014/0239963 A1 | 8/2014 | Nakano et al. | |
| 2014/0308578 A1 | 10/2014 | Onizuka et al. | |
| 2014/0322576 A1 | 10/2014 | Okumura et al. | |
| 2014/0322579 A1 | 10/2014 | Mitsuhashi et al. | |
| 2014/0342245 A1 | 11/2014 | Ito et al. | |
| 2015/0044533 A1 | 2/2015 | Tode et al. | |
| 2015/0104702 A1 | 4/2015 | Hojo et al. | |
| 2015/0125752 A1 | 5/2015 | Nishimura et al. | |
| 2015/0140361 A1 | 5/2015 | Abe et al. | |
| 2015/0270522 A1 | 9/2015 | Yamada et al. | |
| 2015/0372308 A1 | 12/2015 | Sakai et al. | |
| 2016/0006029 A1 | 1/2016 | Sugaya et al. | |
| 2016/0013516 A1 | 1/2016 | Heishi et al. | |
| 2016/0079632 A1 | 3/2016 | Fukunaga et al. | |
| 2016/0111752 A1 | 4/2016 | Fukunaga et al. | |
| 2016/0156070 A1 | 6/2016 | Minami et al. | |
| 2016/0308252 A1 | 10/2016 | Iriyama et al. | |
| 2016/0329560 A1 | 11/2016 | Young et al. | |
| 2016/0329601 A1 | 11/2016 | Kim et al. | |
| 2016/0380303 A1 | 12/2016 | Minami et al. | |
| 2017/0040642 A1 | 2/2017 | Ito et al. | |
| 2017/0204124 A1 | 7/2017 | Takahashi et al. | |
| 2017/0263979 A1 | 9/2017 | Hanazaki | |
| 2017/0263989 A1 | 9/2017 | Takechi | |
| 2017/0301920 A1 | 10/2017 | Liu et al. | |
| 2017/0301947 A1 | 10/2017 | Makino et al. | |
| 2017/0346137 A1 | 11/2017 | Chang et al. | |
| 2018/0108937 A1 | 4/2018 | Drach et al. | |
| 2018/0138465 A1 | 5/2018 | Yang et al. | |
| 2018/0183103 A1 | 6/2018 | Kawai | |
| 2018/0233780 A1 | 8/2018 | Ishikawa et al. | |
| 2018/0366735 A1 | 12/2018 | Liu et al. | |
| 2019/0123389 A1 | 4/2019 | Nakagaki et al. | |
| 2019/0372125 A1 | 12/2019 | Miyamae et al. | |
| 2019/0386338 A1 | 12/2019 | Kawai et al. | |
| 2020/0091559 A1 | 3/2020 | Noguchi et al. | |
| 2020/0161701 A1 | 5/2020 | Koike | |
| 2020/0176839 A1 | 6/2020 | Elia et al. | |
| 2020/0335823 A1 | 10/2020 | Takahashi et al. | |
| 2021/0043972 A1 | 2/2021 | Sugawara et al. | |
| 2021/0090818 A1 | 3/2021 | Aita et al. | |
| 2021/0159484 A1 | 5/2021 | Yakushiji et al. | |
| 2021/0257606 A1* | 8/2021 | Kim | H01M 10/052 |
| 2021/0265654 A1 | 8/2021 | Vereecken et al. | |
| 2021/0305583 A1 | 9/2021 | Harada | |
| 2021/0313624 A1 | 10/2021 | Morinaka et al. | |
| 2022/0384794 A1* | 12/2022 | Kido | H01M 4/386 |
| 2022/0393167 A1* | 12/2022 | Kido | H01M 10/0569 |
| 2023/0034396 A1* | 2/2023 | Luo | H01M 4/366 |
| 2023/0126762 A1* | 4/2023 | Yushin | H01M 50/431 |
| | | | 429/305 |
| 2023/0136818 A1* | 5/2023 | Kim | H01M 4/5825 |
| | | | 429/306 |
| 2023/0238514 A1* | 7/2023 | Lee | C04B 35/62839 |
| | | | 429/231.4 |
| 2023/0275264 A1* | 8/2023 | Jung | H01M 10/0562 |
| | | | 429/323 |
| 2023/0291005 A1* | 9/2023 | Iida | H01M 10/0568 |
| 2023/0327210 A1* | 10/2023 | Ma | H01M 10/0525 |
| 2023/0335715 A1* | 10/2023 | Oh | H01M 4/36 |
| 2023/0369572 A1* | 11/2023 | Yin | H01M 10/0525 |
| 2023/0369650 A1* | 11/2023 | Pol | H01M 10/0525 |
| 2024/0200218 A1* | 6/2024 | Zhao | C25C 7/02 |
| 2024/0213535 A1* | 6/2024 | Lee | H01M 10/0568 |
| 2024/0283020 A1* | 8/2024 | Ihara | H01M 4/62 |

FOREIGN PATENT DOCUMENTS

| | | |
|---|---|---|
| EP | 2535976 A1 | 12/2012 |
| EP | 3512024 A1 | 7/2019 |
| EP | 3512025 A1 | 7/2019 |
| JP | S62-100949 A | 5/1987 |
| JP | H01-272051 A | 10/1989 |
| JP | H02-253560 A | 10/1990 |
| JP | H05-101847 A | 4/1993 |
| JP | H05-326018 A | 12/1993 |
| JP | H07-296849 A | 11/1995 |
| JP | H08-037024 A | 2/1996 |
| JP | H08-306387 A | 11/1996 |
| JP | H09-063644 A | 3/1997 |
| JP | H09-115514 A | 5/1997 |
| JP | H10-233345 A | 9/1998 |
| JP | H10-247519 A | 9/1998 |
| JP | H11-026015 A | 1/1999 |
| JP | H11-307120 A | 11/1999 |
| JP | H11-307123 A | 11/1999 |
| JP | 2000-164248 A | 6/2000 |
| JP | 2000-294281 A | 10/2000 |
| JP | 2001-043867 A | 2/2001 |
| JP | 2001-043895 A | 2/2001 |
| JP | 2001-085058 A | 3/2001 |
| JP | 2002-015728 A | 1/2002 |
| JP | 2002-015769 A | 1/2002 |
| JP | 2002-083629 A | 3/2002 |
| JP | 2002-083632 A | 3/2002 |
| JP | 2002-184460 A | 6/2002 |
| JP | 2002-184465 A | 6/2002 |
| JP | 2002-534775 A | 10/2002 |
| JP | 2002-343424 A | 11/2002 |
| JP | 2002-358963 A | 12/2002 |
| JP | 2003-100342 A | 4/2003 |
| JP | 2003-217652 A | 7/2003 |
| JP | 2003-217654 A | 7/2003 |
| JP | 2003-282055 A | 10/2003 |
| JP | 2003-297423 A | 10/2003 |

(56) References Cited

FOREIGN PATENT DOCUMENTS

| | | |
|---|---|---|
| JP | 2003-317800 A | 11/2003 |
| JP | 2003-331917 A | 11/2003 |
| JP | 2004-055320 A | 2/2004 |
| JP | 2004-055537 A | 2/2004 |
| JP | 2004-071159 A | 3/2004 |
| JP | 2004-087136 A | 3/2004 |
| JP | 2004-111349 A | 4/2004 |
| JP | 2004-207210 A | 7/2004 |
| JP | 2004-281073 A | 10/2004 |
| JP | 2004-281185 A | 10/2004 |
| JP | 2004-281218 A | 10/2004 |
| JP | 2004-355974 A | 12/2004 |
| JP | 2004-356092 A | 12/2004 |
| JP | 2004-363016 A | 12/2004 |
| JP | 2004-363031 A | 12/2004 |
| JP | 2005-005115 A | 1/2005 |
| JP | 2005-005117 A | 1/2005 |
| JP | 2005-032714 A | 2/2005 |
| JP | 2005-032716 A | 2/2005 |
| JP | 2005-038722 A | 2/2005 |
| JP | 2005-100851 A | 4/2005 |
| JP | 2005-123091 A | 5/2005 |
| JP | 2005-129481 A | 5/2005 |
| JP | 2005-519441 A | 6/2005 |
| JP | 2005-243321 A | 9/2005 |
| JP | 2005-243490 A | 9/2005 |
| JP | 2005-285491 A | 10/2005 |
| JP | 2005-310619 A | 11/2005 |
| JP | 2005-317499 A | 11/2005 |
| JP | 2005-347240 A | 12/2005 |
| JP | 2006-024380 A | 1/2006 |
| JP | 2006-049037 A | 2/2006 |
| JP | 2006-261093 A | 9/2006 |
| JP | 2007-128723 A | 5/2007 |
| JP | 2007-200605 A | 8/2007 |
| JP | 2007-200821 A | 8/2007 |
| JP | 2007-273438 A | 10/2007 |
| JP | 2007-311217 A | 11/2007 |
| JP | 2007-534122 A | 11/2007 |
| JP | 2008-053211 A | 3/2008 |
| JP | 2008-077915 A | 4/2008 |
| JP | 2008-108454 A | 5/2008 |
| JP | 2008-166271 A | 7/2008 |
| JP | 2008-176987 A | 7/2008 |
| JP | 2008-192504 A | 8/2008 |
| JP | 2008-218387 A | 9/2008 |
| JP | 2008-257988 A | 10/2008 |
| JP | 2009-503769 A | 1/2009 |
| JP | 2009-508304 A | 2/2009 |
| JP | 2009-158460 A | 7/2009 |
| JP | 2009-176534 A | 8/2009 |
| JP | 2009-187880 A | 8/2009 |
| JP | 2009-283463 A | 12/2009 |
| JP | 2009-302058 A | 12/2009 |
| JP | 2010-010095 A | 1/2010 |
| JP | 2010-015717 A | 1/2010 |
| JP | 2010-123287 A | 6/2010 |
| JP | 2010-527101 A | 8/2010 |
| JP | 2010-529608 A | 8/2010 |
| JP | 2010-529633 A | 8/2010 |
| JP | 2011-054406 A | 3/2011 |
| JP | 2011-071098 A | 4/2011 |
| JP | 2011-119183 A | 6/2011 |
| JP | 2011-187440 A | 9/2011 |
| JP | 2011-222431 A | 11/2011 |
| JP | 2012-134151 A | 7/2012 |
| JP | 2013-037772 A | 2/2013 |
| JP | 2013-037864 A | 2/2013 |
| JP | 2013-089445 A | 5/2013 |
| JP | 2013-097973 A | 5/2013 |
| JP | 2013-131293 A | 7/2013 |
| JP | 2013-243010 A | 12/2013 |
| JP | 2014-026932 A | 2/2014 |
| JP | 2014-035897 A | 2/2014 |
| JP | 2014-035936 A | 2/2014 |
| JP | 2014-110235 A | 6/2014 |
| JP | 2014-522077 A | 8/2014 |
| JP | 2014-225481 A | 12/2014 |
| JP | 2014-229563 A | 12/2014 |
| JP | 2015-028875 A | 2/2015 |
| JP | 2015-069702 A | 4/2015 |
| JP | 2015-534254 A | 11/2015 |
| JP | 2016-062738 A | 4/2016 |
| JP | 2016-066549 A | 4/2016 |
| JP | 2016-139610 A | 8/2016 |
| JP | 2016-162627 A | 9/2016 |
| JP | 2016-184463 A | 10/2016 |
| JP | 2017-010819 A | 1/2017 |
| JP | 2017-069164 A | 4/2017 |
| JP | 2017-147184 A | 8/2017 |
| JP | 2017-191740 A | 10/2017 |
| JP | 2017-532740 A | 11/2017 |
| JP | 2018-014209 A | 1/2018 |
| JP | 2018-081913 A | 5/2018 |
| JP | 2018-106950 A | 7/2018 |
| JP | 2018-113186 A | 7/2018 |
| JP | 2018-147740 A | 9/2018 |
| JP | 2018-181758 A | 11/2018 |
| JP | 2018-190624 A | 11/2018 |
| JP | 2019-526913 A | 9/2019 |
| JP | 2019-526914 A | 9/2019 |
| JP | 2020-071944 A | 5/2020 |
| WO | 00/41258 A1 | 7/2000 |
| WO | 02/21631 A1 | 3/2002 |
| WO | 03/075373 A2 | 9/2003 |
| WO | 2005/036690 A1 | 4/2005 |
| WO | 2005/091422 A1 | 9/2005 |
| WO | 2006/077763 A1 | 7/2006 |
| WO | 2006/088009 A1 | 8/2006 |
| WO | 2006/106655 A1 | 10/2006 |
| WO | 2006/115023 A1 | 11/2006 |
| WO | 2007/012174 A1 | 2/2007 |
| WO | 2007/030297 A2 | 3/2007 |
| WO | 2007/043624 A1 | 4/2007 |
| WO | 2008/032657 A1 | 3/2008 |
| WO | 2008/078626 A1 | 7/2008 |
| WO | 2008/096729 A1 | 8/2008 |
| WO | 2008/138110 A1 | 11/2008 |
| WO | 2008/153296 A1 | 12/2008 |
| WO | 2009/028567 A1 | 3/2009 |
| WO | 2009/035085 A1 | 3/2009 |
| WO | 2009/107786 A1 | 9/2009 |
| WO | 2011/016112 A1 | 2/2011 |
| WO | 2011/016113 A1 | 2/2011 |
| WO | 2011/027530 A1 | 3/2011 |
| WO | 2012/142060 A2 | 10/2012 |
| WO | 2013/076847 A1 | 5/2013 |
| WO | 2014/074118 A1 | 5/2014 |
| WO | 2015/001717 A1 | 1/2015 |
| WO | 2015/025882 A1 | 2/2015 |
| WO | 2015/087580 A1 | 6/2015 |
| WO | 2017/179681 A1 | 10/2017 |
| WO | 2018/221346 A1 | 12/2018 |
| WO | 2019/146731 A1 | 8/2019 |

\* cited by examiner

LITHIUM ION SECONDARY BATTERY

BACKGROUND OF THE INVENTION

Field of the Invention

The present invention relates to a lithium ion secondary battery. Priority is claimed on Japanese Patent Application No. 2021-088276 filed on May 26, 2021, the content of which is incorporated herein by reference.

Description of Related Art

Lithium ion secondary batteries are also widely utilized as a power source for mobile devices, such as mobile phones and notebook computers, and for hybrid cars.

The capacities of lithium ion secondary batteries mainly depend on the active material of electrodes. Graphite is generally utilized as a negative electrode active material, but a negative electrode active material with a higher capacity is required. Therefore, attention has been paid to a negative electrode active material containing silicon (Si) which has a much larger theoretical capacity than the theoretical capacity of graphite (372 mAh/g).

For example, Patent Documents 1 to 3 describe that a negative electrode active material containing silicon can be utilized for a lithium ion secondary battery. Furthermore, Patent Documents 1 to 3 describe that the cycle characteristics of a lithium ion secondary battery are improved using an electrolytic solution containing a specific lithium salt and an ether compound.

Patent Documents

[Patent Document 1] Japanese Unexamined Patent Application, First Publication No. 2009-176534
[Patent Document 2] Japanese Unexamined Patent Application, First Publication No. 2014-110235
[Patent Document 3] Published Japanese Translation No. 2015-534254 of the PCT International Publication

SUMMARY OF THE INVENTION

Negative electrode active materials containing silicon can store a large amount of energy with a high capacity. However, if the stored energy become uncontrollable, there is a concern regarding thermal runaway of an active material. For this reason, there is a need to develop a lithium ion secondary battery which is highly safe even when a high-capacity silicon-based negative electrode active material is utilized.

The present disclosure was made in view of the above problems, and an object of the present disclosure is to provide a lithium ion secondary battery having excellent safety.

The following means are provided to achieve the above object.

(1) A lithium ion secondary battery according to a first aspect includes a positive electrode, a negative electrode, a separator located between the positive electrode and the negative electrode, and an electrolytic solution. The negative electrode includes a negative electrode active material which contains silicon oxide and a compound containing a first element. The electrolytic solution contains an imide salt which contains the first element and an imide anion. And the first element is at least one or more elements selected front the group consisting of K, Na, Mg, Ca, Cs, Al, and Zn.

(2) In the lithium ion secondary battery according to the above aspect, a molarity proportion of the imide salt containing the first element in the electrolytic solution may be 5% or more and 20% or less with respect to a molarity proportion of the lithium salt in the electrolytic solution.

(3) In the lithium ion secondary battery according to the above aspect, the compound containing the first element may be at least one selected from the group consisting of fluoride, oxide, silicide, silicon oxide, and phosphorus oxide.

(4) In the lithium ion secondary battery according to the above aspect, the negative electrode active material may include a core and a coating layer with which the core is coated. And the coating layer may contain the compound containing the first element.

(5) In the lithium ion secondary battery according to the above aspect, the silicon oxide may be represented by $SiO_x$ and x may satisfy $0.8 \leq x \leq 2$.

(6) In the lithium ion secondary battery according to the above aspect, a median diameter (D50) of the negative electrode active material may be 1 μm or more and 10 μm or less.

A lithium ion secondary battery according to the above aspect has excellent safety.

DETAILED DESCRIPTION OF THE INVENTION

Figure 1:
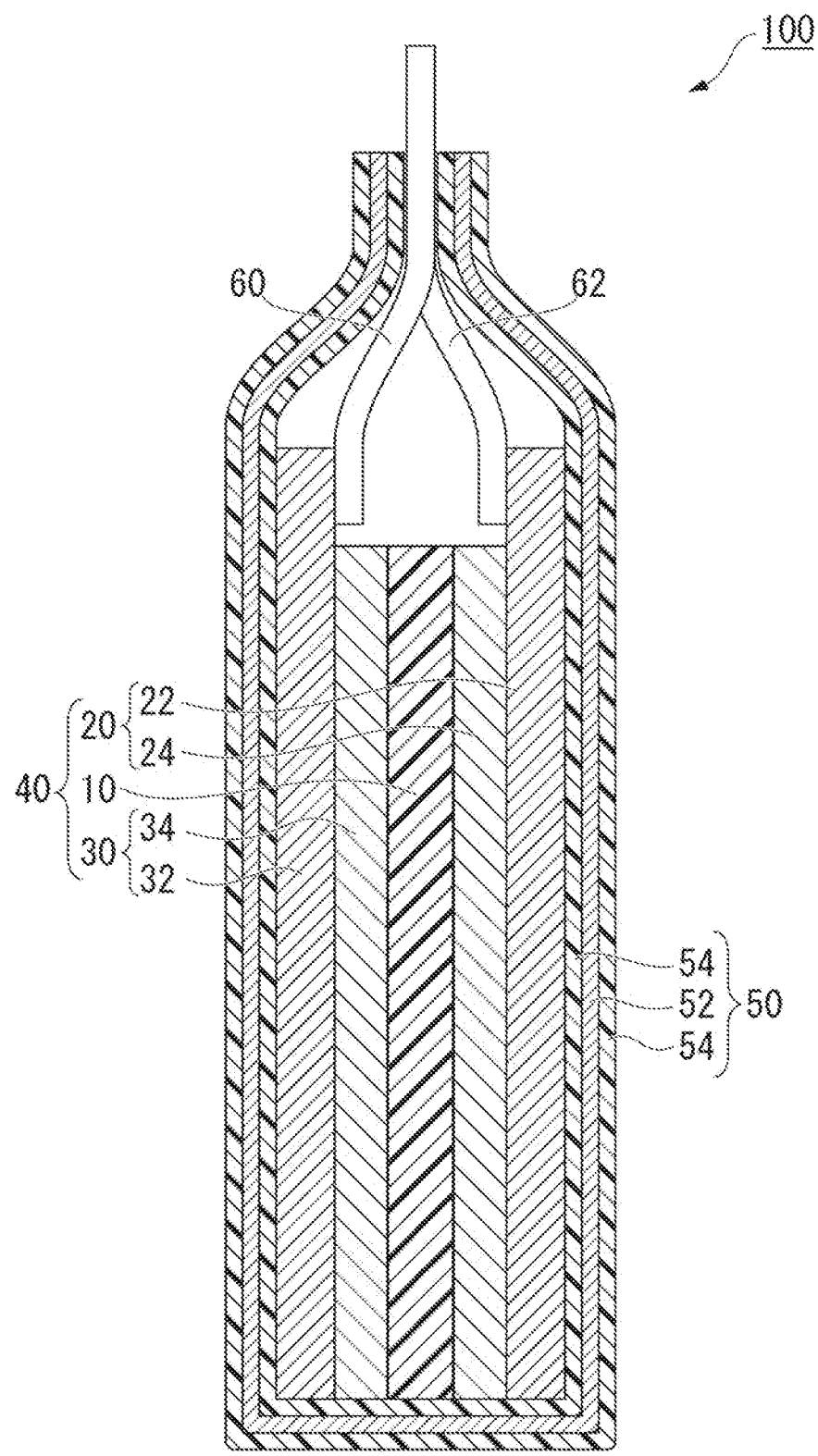
FIG. 1 is a schematic diagram of a lithium ion secondary battery according to a first embodiment.

Embodiments will be described in detail below with reference to the drawings as appropriate. In the drawings used in the following description, an enlarged feature portion may be provided for convenience to make the feature easy to understand, and a dimensional ratio of each constituent element may be different from that of the actual constituent element. The materials, the dimensions, and the like exemplified in the following description are examples, the present invention is not limited thereto, and the present invention can be appropriately modified without changing the gist of the present invention.

Lithium Ion Secondary Battery

FIG. 1 is a schematic view of a lithium ion secondary battery according to a first embodiment. A lithium ion secondary battery 100 shown in FIG. 1 includes a power generation element 40, an exterior body 50, and a non-aqueous electrolytic solution (not shown). The periphery of the power generation element 40 is covered with the exterior body 50. The power generation element 40 is connected to the outside through a pair of terminals 60 and 62 which are connected. The non-aqueous electrolytic solution is accommodated in the exterior body 50.

(Power Generation Element)

The power generation element 40 includes a positive electrode 20, a negative electrode 30, and a separator 10.

<Positive Electrode>

The positive electrode 20 includes, for example, a positive electrode current collector 22 and a positive electrode active material layer 24. The positive electrode active material layer 24 is in contact with at least one surface of the positive electrode current collector 22.

[Positive Electrode Current Collector]

The positive electrode current collector 22 is, for example, a conductive sheet material. The positive electrode current collector 22 is, for example, a thin metal sheet made of aluminum, copper, nickel, titanium, stainless steel, or the like. It is preferable that aluminum which has a light weight be utilized for the positive electrode current collector 22. An average thickness of the positive electrode current collector 22 is, for example, 10 µm or more and 30 µm or less.

[Positive Electrode Active Material Layer]

The positive electrode active material layer 24 contains, for example, a positive electrode active material. The positive electrode active material layer 24 may contain a conductive auxiliary agent and a binder if necessary.

A basis weight of the positive electrode active material layer 24 is, for example, 15 mg/cm$^2$ or more, and preferably 20 mg/cm$^2$ or more. The basis weight of the positive electrode active material layer 24 is, for example, preferably 35 mg/cm$^2$ or less. The basis weight means the mass of the positive electrode active material layer 24 supported on a surface of the positive electrode current collector 22 per unit area. When the basis weight is large, an amount of the positive electrode active material per unit area increases and the capacity of the battery increases. On the other hand, if the basis weight is too large, it becomes difficult for the electrolytic solution to impregnate into the positive electrode active material layer 24.

The positive electrode active material includes an electrode active material capable of reversibly advancing the occlusion and release of lithium ions, the desorption and insertion (intercalation) of lithium ions, or the doping and dedoping of lithium ions and counter anions.

The positive electrode active material is, for example, a composite metal oxide. Examples of the composite metal oxide include lithium cobaltate (LiCoO$_2$), lithium nickelate (LiNiO$_2$), lithium manganate (LiMnO$_2$), lithium manganese spinel (LiMn$_2$O$_4$), and a compound of the general expression: LiNi$_x$Co$_y$Mn$_z$M$_a$O$_2$ (in the general expression, x+y+z+a=1, 0≤x<1, 0≤y<1, 0≤z<1, and 0≤a<1, and M is one or more elements selected from Al, Mg, Nb, Ti, Cu, Zn, and Cr), a lithium vanadium compound (LiV$_2$O$_5$), olivine type LiMPO$_4$ (where M indicates one or more elements selected from Co, Ni, Mn, Fe, Mg, Nb, Ti, Al, and Zr or VO), lithium titanate (Li$_4$Ti$_5$O$_{12}$), and LiNi$_x$Co$_y$Al$_z$O$_2$ (0.9<x+y+z<1.1). The positive electrode active material may be an organic substance. For example, the positive electrode active material may be polyacetylene, polyaniline, polypyrrole, polythiophene, or polyacene.

The positive electrode active material may be a lithium-free material. The lithium-free material is, for example, FeF$_3$, a conjugated polymer containing an organic conductive substance, a chevrel phase compound, a transition metal chalcogenide, a vanadium oxide, a niobium oxide, or the like. As the lithium-free material, only one of these materials may be utilized or a combination of a plurality of materials may be utilized. When the positive electrode active material is a lithium-free material, for example, electric discharge is performed first. Lithium is inserted into the positive electrode active material through electric discharge. In addition, lithium may be chemically or electrochemically pre-doped into a lithium-free material for the positive electrode active material.

Conductive auxiliary agents each enhance electron conductivity between positive electrode active materials. The conductive auxiliary agent is, for example, a carbon powder, a carbon nanotube, a carbon material, a metal fine powder, a mixture of a carbon material and a metal fine powder, or a conductive oxide. The carbon powder is, for example, carbon black, acetylene black, ketjen black, and the like. The metal fine powder is, for example, powder of copper, nickel, stainless steel, iron, or the like.

The binder binds the active material together. As the binder, a known binder can be utilized. The binder is, for example, a fluororesin. Examples of the fluororesin include polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), ethylene-tetrafluoroethylene copolymer (ETFE), polychlorotrifluoroethylene (PCTFE), ethylene-chlorotrifluoroethylene copolymer (ECTFE), polyvinyl fluoride (PVF), and the like.

In addition to the above, examples of the binder include a vinylidene fluoride fluororubber such as vinylidene fluoride-hexafluoropropylene-based fluororubber (VDF-HFP-based fluororubber), vinylidene fluoride-hexafluoropropylene-tetrafluoroethylene-based fluororubber (VDF-HFP-TFE-based fluororubber), vinylidenefluoride-pentafluoropropylene-based fluororubber (VDF-PFP-based fluororubber), vinylidene fluoride-pentafluoropropylene-tetrafluoroethylene-based fluororubber (VDF-PFP-TFE-based fluororubber), vinylidene fluoride-perfluoromethyl vinyl ether-tetrafluoroethylene-based fluororubber (VDF-PFMVE-TFE-based fluororubber), and vinylidene fluoride-chlorotrifluoroethylene-based fluororubber (VDF-CTFE-based fluororubber). Furthermore, the binder may be, for example, cellulose, a styrene/butadiene rubber, an ethylene/propylene rubber, a polyimide resin, a polyamide-imide resin, an acrylic resin, or the like.

Also, the binder may be a conductive polymer with electron conductivity or a conductive polymer with ion conductivity. Examples of the conductive polymer with electron conductivity include polyacetylene, polythiophene, polyaniline, and the like. Examples of the conductive polymer with ion conductivity include a composite substance of a polyether-based polymer compound and a lithium salt. Examples of the polyether-based polymer compound include a polyethylene oxide, a polypropylene oxide, and the like. Examples of the lithium salt include LiFSI, LiTFSI, LiBETI, LiClO$_4$, LiBF$_4$, LiPF$_6$, and the like.

A compositional proportion of the positive electrode active material in the positive electrode active material layer 24 is, for example, 80% or more and 98% or less in terms of mass ratio. Furthermore, a compositional proportion of the conductive auxiliary agent in the positive electrode active material layer 24 is, for example, 1.0% or more and 10% or less in terms of mass ratio. In addition, a compositional proportion of the binder in the positive electrode active material layer 24 is, for example. 1.0% or more and 10% or less in terms of mass ratio.

<Negative Electrode>

The negative electrode 30 includes, for example, a negative electrode current collector 32 and a negative electrode active material layer 34. The negative electrode active material layer 34 is formed on at least one surface of the negative electrode current collector 32.

[Negative Electrode Current Collector]

The negative electrode current collector 32 is, for example, a conductive sheet material. As the negative electrode current collector 32. the same collector as that of the positive electrode current collector 22 can be utilized.

[Negative Electrode Active Material Layer]

The negative electrode active material layer 34 contains a negative electrode active material and a binder. Furthermore, the negative electrode active material layer 34 may contain a conductive auxiliary agent if necessary. The negative electrode active material contains silicon oxide and a compound containing a first element.

A silicon oxide is represented by $SiO_x$. x satisfies $0.8 \leq x \leq 2$. Silicon oxide may be composed of only $SiO_2$, may be composed of only SiO, or may be a mixture of SiO and $SiO_2$. Furthermore, a part of oxygen in a silicon oxide may be deficient. A silicon oxide may be crystalline or amorphous.

The compound containing the first element is, for example, one or more selected from the group consisting of fluoride, oxide, silicide, and silicon oxide. The first element is any one or more elements selected from the group consisting of K, Na, Mg, Ca, Cs, Al, and Zn. The first element is not limited to one type of element and may be of a plurality of types of element groups. For example, when the first element is Mg, the compounds containing the first element are, for example, $MgF_2$, MgO, $Mg_2Si$, $Li_xMg_ySi$, and $Mg_2SiO_4$.

Figure 2:
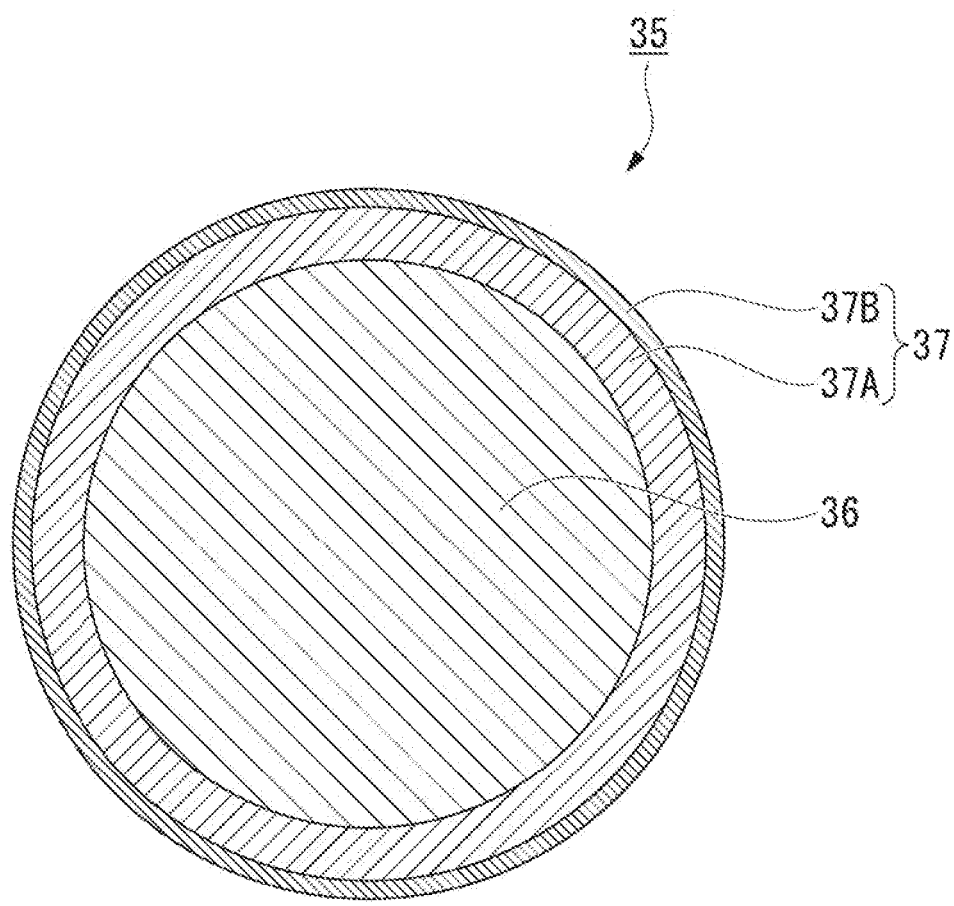
FIG. 2 is a schematic diagram of a negative electrode active material according to the first embodiment.

FIG. 2 is a schematic diagram of a negative electrode active material 35 according to the first embodiment. The negative electrode active material 35 may include a core 36 and a coating layer 37. At least a part of the core 36 is covered with the coating layer 37. The entire surface of the core 36 may be covered with the coating layer 37. The coating layer 37 makes an insertion/desorption reaction of Li uniform and minimizes deterioration of the negative electrode active material 35.

The core 36 contains silicon oxide. The core 36 is, for example, silicon oxide. The coating layer 37 contains, for example, silicon oxide and a compound containing a first element. The coating layer 37 may contain a carbon material, a metal fine powder, a mixture of a carbon material and a metal fine powder, a conductive oxide, an inorganic compound, and the like. The carbon material is, for example, a carbon powder, a carbon nanotube, or the like. The metal fine powder is, for example, copper, cobalt, iron, or the like. The inorganic material is, for example, ceramics, oxides, carbides, nitrides, borides, and the like.

The coating layer 37 may include a first layer 37A and a second layer 37B. The second layer 37B is the outermost surface layer of the coating layer 37. The second layer 37B may contain a reaction product of the first element and the material contained in the electrolytic solution. For example, when the first element is Mg, the reaction product of the first element and the material contained in the electrolytic solution is, for example, $Mg_3(PO_4)_2$.

A median diameter (D50) of the negative electrode active material is, for example, 1 μm or more and 10 μm or less. When a particle size of the negative electrode active material is within a range, the coating layer of the negative electrode active material is difficult to peel off due to volume expansion and the first element is efficiently supplied from the electrolytic solution to the negative electrode active material. As a result, a resistance layer (details will be described later) generated through a reaction between the first element and oxygen can be stably maintained.

The discharge specific capacity of the negative electrode active material is, for example, 1000 mAh/g or more and 2500 mAh/g or less. The discharge specific capacity of the negative electrode active material can be adjusted by changing a thickness of the positive electrode active material layer 24 of the positive electrode 20. When the discharge specific capacity of the negative electrode active material increases, the negative electrode has a low potential. In addition, when the discharge specific capacity of the negative electrode active material decreases, the negative electrode has a high potential. When the negative electrode potential has a low potential, the stability of the lithium ion secondary battery 100 is improved.

The conductive auxiliary agent enhances electronic conductivity between the negative electrode active materials. As the conductive auxiliary agent, the same material as that of the positive electrode 20 can be utilized.

The binder binds the negative electrode active materials together and also binds the negative electrode active material and the negative electrode current collector 32. As the binder, the same binder as that used for the positive electrode 20 can be utilized.

The contents of the negative electrode active material, the conductive auxiliary agent, and the binder in the negative electrode active material layer 34 are not particularly limited. The compositional proportion of the negative electrode active material in the negative electrode active material layer 34 is, for example, 70% or more and 100% or less in terms of mass ratio. Furthermore, the compositional proportion of the conductive auxiliary agent in the negative electrode active material layer 34 is, for example, 0% or more and 10% or less in terms of mass ratio. The compositional proportion of the hinder in the negative electrode active material layer 34 is, for example, 0% or more and 20% or less in terms of mass ratio.

<Separator>

The separator 10 is disposed between the positive electrode 20 and the negative electrode 30. The separator 10 isolates the positive electrode 20 and the negative electrode 30 and prevents a short circuit between the positive electrode 20 and the negative electrode 30. The separator 10 extends in a plane along the positive electrode 20 and the negative electrode 30. Lithium ions can pass through the separator 10.

The separator 10 has, for example, an electrically insulating porous structure. The separator 10 is, for example, a monolayer or a laminated body formed of a polyolefin film. The separator 10 may be a stretching film made of a mixture of polyethylene, polypropylene, or the like. The separator 10 may be a fibrous nonwoven fabric made of at least one constituent material selected from the group consisting of cellulose, polyester, polyacrylonitrile, polyamide, polyethylene, and polypropylene. The separator 10 may be, for example, a solid electrolyte. The solid electrolyte is, for example, a polymer solid electrolyte, an oxide-based solid electrolyte, or a sulfide-based solid electrolyte. The separator 10 may be an inorganic coated separator. The inorganic coated separator is obtained by coating a surface of the above film with a mixture of a resin such as PVDF or CMC and an inorganic substance such as alumina or silica. The inorganic coated separator has excellent heat resistance and minimizes the precipitation of transition metals eluted from the positive electrode on a surface of the negative electrode.

<Electrolytic Solution>

The electrolytic solution is sealed in the exterior body 50 and impregnated into the power generation element 40. The non-aqueous electrolytic solution has, for example, a non-aqueous solvent and an electrolyte. The electrolyte is dissolved in a non-aqueous solvent. The electrolytic solution contains, for example, a solvent, an electrolyte, and an imide salt. The imide salt may be of one kind or two or more kinds.

The solvent is not particularly limited as long as it is a solvent generally used for lithium ion secondary batteries. The solvent includes, for example, any of a cyclic carbonate compound, a chain carbonate compound, a cyclic ester compound, and a chain ester compound. The solvent may contain a mixture of these in any proportions. The cyclic carbonate compound is, for example, ethylene carbonate (EC), propylene carbonate (PC), or the like. The chain carbonate compound is, for example, diethyl carbonate (DEC), ethyl methyl carbonate (EMC), or the like. The cyclic ester compound is, for example, γ-butyrolactone or the like. The chain ester compound is, for example, propyl propionate, ethyl propionate, ethyl acetate, or the like.

The solvent may include a fluorinated organic solvent. The fluorinated organic solvent forms a good coating film on a surface of the negative electrode active material. When a decomposition product of the fluorinated organic solvent and the first element contained in the electrolytic solution are contained in the coating film, Li ions are easily transported in the coating film. As a result, an increase in the resistance of the lithium ion secondary battery 100 is minimized.

The electrolyte is, for example, a lithium salt. Examples of the electrolyte include $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, LiBOB, and the like. One type of lithium salt may be used alone or a combination of two or more types of lithium salts may be used. From the viewpoint of a degree of ionization, it is preferable that the electrolyte contain $LiPF_6$.

The imide salt contains a first element and an imide anion. The first element is as described above. The first element contained in the electrolytic solution and the first element contained in the negative electrode active material layer 34 are, for example, the same element. The first element contained in the electrolytic solution and the first element contained in the negative electrode active material layer 34 may be different elements. The imide salt is not limited to one type and a plurality of types may be contained in the electrolytic solution.

Examples of the imide anion include $(SO_2F)_2N^-$ (FSI$^-$:bis(fluorosulfonyl)imide anion), $(SO_2CF_3)_2N^-$ (TFSI$^-$:bis(trifluoromethanesulfonyl)imide anion), $(SO_2C_2F_5)_2N^-$ (BETI$^-$: bis(pentafluoroethanesulfonyl)imide anion), $(SO_2F)(SO_2CF_3)N^-$, and $(SO_2CF_3)(SO_2C_2F_5)N^-$. One type of imide anion may be used alone or a combination of two or more types of imide anions may be used.

A molarity proportion of the imide salt containing the first element in the electrolytic solution is, for example, 5% or more and 20% or less with respect to a molarity proportion of the lithium salt in the electrolytic solution. If a sufficient imide salt of the first element is contained in the electrolytic solution, it is possible to prevent the first element from being depleted even if the first element continues to react with oxygen. Furthermore, if an excess imide salt of the first element is contained in the electrolytic solution, the viscosity of the electrolytic solution increases and the ability of the electrolytic solution to become impregnated into the positive electrode 20 and the negative electrode 30 decreases.

The molarity proportion of the first element and lithium in the electrolytic solution can be measured through, for example, gas chromatography, inductively coupled plasma (ICP) emission spectrometry, ICP mass analysis, and the like.

<Exterior Body>

The exterior body 50 seals the power generation element 40 and the non-aqueous electrolytic solution therein. The exterior body 50 suppresses leakage of the non-aqueous electrolytic solution to the outside and introduction of water and the like into the inside of the lithium ion secondary battery 100 from the outside.

The exterior body 50 has, for example, as shown in FIG. 1, a metal foil 52 and a resin layer 54 laminated on each surface of the metal foil 52. The exterior body 50 is a metal laminate film obtained by coating the metal foil 52 with a polymer film (resin layer 54) from both sides.

As the metal foil 52, for example, an aluminum foil can be used. A polymer film such as polypropylene can be used for the resin layer 54. A material constituting the resin layer 54 may be different between the inside and the outside. For example, a polymer having a high melting point, for example, polyethylene terephthalate (PET), polyamide (PA), or the like can be used as an outer material and polyethylene (PE), polypropylene (PP), or the like can be used as a material of an inner polymer film.

<Terminal>

The terminals 60 and 62 are connected to the positive electrode 20 and the negative electrode 30, respectively. The terminal 60 connected to the positive electrode 20 is a positive electrode terminal and the terminal 62 connected to the negative electrode 30 is a negative electrode terminal. The terminals 60 and 62 are responsible for electrical connection with the outside. The terminals 60 and 62 are formed of a conductive material such as aluminum, nickel, and copper. A connection method may be welding or screwing. It is preferable to protect the terminals 60 and 62 with an insulating tape to prevent a short circuit.

"Method for Producing Lithium Ion Secondary Battery"

The lithium ion secondary battery 100 is prepared by preparing the negative electrode 30, the positive electrode 20, the separator 10, the electrolytic solution, and the exterior body 50 and assembling them. An example of a method for producing the lithium ion secondary battery 100 will be described below.

The negative electrode 30 is prepared through, for example, a compounding step, a slurry manufacturing step, an electrode coating step, a drying step, and a rolling step in this order.

The compounding step is a step of mixing silicon oxide and a compound containing the first element while applying a shearing force. The surface of silicon oxide is coated with a compound containing the first element by compounding step. Furthermore, the particle size of the negative electrode active material can be adjusted by the degree of mixing. In addition, the prepared negative electrode active material may be sieved to make the particle size uniform.

The slurry manufacturing step is a step of mixing the combined negative electrode active material, the binder, and the solvent as a compound to prepare a slurry. In the slurry manufacturing step, a conductive auxiliary agent may be added if necessary. The solvent is, for example, water, N-methyl-2-pyrrolidone, and the like. The compositional proportions of the negative electrode active material, the conductive material, and the binder is preferably 70 wt % to 100 wt %:0 wt % to 10 wt %:0 wt % to 20 wt % in terms of mass ratio. These mass ratios are adjusted to be 100 wt % as a whole.

The electrode coating step is a step of coating a surface of the negative electrode current collector 32 with the slurry. A slurry coating method is not particularly limited. For example, a slit die coat method and a doctor blade method can be utilized as the slurry coating method.

The drying step is a step of removing the solvent from the slurry. For example, the negative electrode current collector 32 coated with the slurry is dried in an atmosphere of 80° C.

to 150° C. When the slurry dries, the negative electrode active material layer 34 is formed on the negative electrode current collector 32.

The rolling step is performed if necessary. The rolling step is a step of applying pressure to the negative electrode active material layer 34 to adjust a density of the negative electrode active material layer 34. The rolling step is performed using, for example, a roll press device or the like.

The positive electrode 20 can be prepared by the same procedure as that of the negative electrode 30 except that the compounding step is not performed. As the separator 10 and the exterior body 50, commercially available separator and exterior body can be utilized.

The electrolytic solution can be prepared, for example, by adding the imide salt containing the first element and the imide anion to the mixture of the lithium salt and the solvent and mixing them.

Subsequently, the power generation element 40 is prepared by laminating the separator 10 and the prepared positive electrode 20 and negative electrode 30 so that the separator 10 is located between the prepared positive electrode 20 and negative electrode 30. When the power generation element 40 is a wound body, the positive electrode 20, the negative electrode 30, and the separator 10 are wound using one end side of the positive electrode 20, the negative electrode 30, and the separator 10 as an axis, Finally, the power generation element 40 is sealed in the exterior body 50. The non-aqueous electrolytic solution is injected into the exterior body 50. The non-aqueous electrolytic solution is impregnated into the power generation element 40 by injecting the non-aqueous electrolytic solution and then reducing the pressure, the heating, or the like. When the exterior body 50 is sealed by applying heat or the like, the lithium ion secondary battery 100 can be obtained. The power generation element 40 may be impregnated into the electrolytic solution instead of injecting the electrolytic solution into the exterior body 50.

The lithium ion secondary battery 100 according to the first embodiment has excellent safety. The reason for this will be described below.

The negative electrode active material containing silicon can store a large amount of energy with a high capacity. On the other hand, if an internal short circuit or the like occurs and the stored energy becomes uncontrollable, thermal runaway of the lithium ion secondary battery may occur in some cases. Thermal runaway of the lithium ion secondary battery adversely affects peripheral elements and leads to ignition in the worst case.

In the lithium ion secondary battery 100 according to the first embodiment, the compound containing the first element is present in the negative electrode active material. The first element contained in the negative electrode active material reacts with oxygen contained in silicon oxide using the heat generated in the process leading to thermal runaway or the like. If the first element reacts with oxygen, an oxide containing the first element is produced. Oxides have high resistance and form a resistance layer. The resistance layer inhibits an internal short circuit. Thermal runaway of the lithium ion secondary battery occurs when the heat generated due to the internal short circuit cannot be exhausted in time. In the lithium ion secondary battery 100 according to the first embodiment, a continuous internal short circuit can be inhibited by the resistance layer and thermal runaway can be prevented.

Furthermore, in the lithium ion secondary battery 100 according to the first embodiment, the imide salt containing the first element is present in the electrolytic solution. For this reason, even when the first element in the negative electrode active material is depleted due to a reaction between oxygen and the compound containing the first element, the first element can be supplied to the negative electrode active material from the electrolytic solution. Therefore, the lithium ion secondary battery 100 can continuously form a resistance layer and has high stability.

Also, if the first element is contained in the coating layer 37 of the negative electrode active material, a resistance layer is formed in the coating layer 37 which is the outermost layer of the negative electrode active material and an internal short circuit can be efficiently prevented. Therefore, if the first element is contained in the coating layer 37 of the negative electrode active material, the safety of the lithium ion secondary battery 100 is further enhanced.

Although the embodiments of the present invention have been described in detail above with reference to the drawings, each constitution and a combination thereof in each embodiment are examples and the constitutions can be added, omitted, replaced, and other changes are possible without departing from the gist of the present invention.

EXAMPLES

Example 1

One surface of an aluminum foil having a thickness of 15 μm was coated with a positive electrode slurry. The positive electrode slurry was prepared by mixing a positive electrode active material, a conductive auxiliary agent, a binder, and a solvent.

$Li_xCoO_2$ was used as the positive electrode active material. Acetylene black was used as the conductive auxiliary agent. Polyvinylidene fluoride (PVDF) was used as the binder. N-methyl-2-pyrrolidone was used as the solvent. The positive electrode slurry was prepared by mixing 97 parts by mass of the positive electrode active material, 1 part by mass of the conductive auxiliary agent, 2 parts by mass of the binder, and 70 parts by mass of the solvent. An amount of a positive electrode active material supported on a dried positive electrode active material layer was 25 mg/cm$^2$. The solvent was removed from the positive electrode slurry in a drying furnace to prepare a positive electrode active material layer. A positive electrode was prepared by pressing the positive electrode active material layer through a roll press.

A negative electrode active material was prepared by combining silicon oxide, magnesium oxide, and LiF as a compound using Mechanofusion manufactured by Hosokawa Micron tilted at 10 degrees. A rotation speed of the device at the time of performing compounding was set to 2500 rpm. Magnesium oxide was an oxide containing the first element. A median diameter of the negative electrode active material which has been subjected to the compounding treatment was 3 μm. A coating layer containing Mg was formed on a surface of the negative electrode active material.

Subsequently, one surface of a copper foil having a thickness of 10 μm was coated with a negative electrode slurry. A negative electrode slurry was prepared by mixing a negative electrode active material, a conductive auxiliary agent, a binder, and a solvent. A negative electrode active material had been subjected to the above compounding treatment. Carbon black was used as the conductive auxiliary agent. A polyimide resin was used as the binder. N-methyl-2-pyrrolidone was used as the solvent. A negative electrode slurry was prepared by mixing 90 parts by mass of the negative electrode active material, 5 parts by mass of the conductive auxiliary agent, and 5 parts by mass of the binder with N-methyl-2-pyrrolidone. An amount of a negative electrode active material supported on a dried negative electrode active material layer was 3.0 mg/cm². A negative electrode active material layer was prepared by removing the solvent from a negative electrode active slurry in a drying furnace. The negative electrode active material layer was pressed through a roll press and then heat-fired at 300° C. or higher for 5 hours in a nitrogen atmosphere.

Subsequently, the solvent was prepared by mixing fluoromethylene carbonate (FEC), ethylene carbonate (EC), propylene carbonate (PC), and diethyl carbonate (DEC) so that a volume ratio was fluoromethylene carbonate (FEC): ethylene carbonate (EC):propylene carbonate (PC):diethyl carbonate (DEC)=5:5:20:70. $LiPF_6$ was dissolved in this mixed solvent to have a concentration of 1 mol/L. After that, with respect to this solution, the electrolytic solution was prepared by adding $Mg(TFSI)_2$ as an imide salt to the electrolytic solution. The imide salt concentration of the first element with respect to the Li salt concentration was adjusted to be 10% (0.1 mol/L).

(Preparation of Lithium Ion Secondary Battery for Evaluation)

A laminated body was obtained by laminating the prepared negative electrode and positive electrode via the separator (porous polyethylene sheet) so that the positive electrode active material layer and the negative electrode active material layer faced each other. A nickel negative electrode lead was attached to a negative electrode of the laminated body. An aluminum positive electrode lead was attached to a positive electrode of the laminated body. The positive electrode lead and the negative electrode lead were welded through an ultrasonic welder. This laminated body was inserted into the exterior body formed of an aluminum laminated film and heat-sealed except for one peripheral portion to form a closed portion. Furthermore, finally, after injecting the electrolytic solution into the exterior body, the remaining one place was sealed with a heat seal while reducing the pressure with a vacuum sealer to prepare a lithium ion secondary battery. For the lithium ion secondary battery, 10 cells of the same sample were prepared.

Also, an electrolytic solution was collected from a lithium ion secondary battery. Subsequently, a composition of the collected electrolytic solution was analyzed using ICP emission. As a result, it was confirmed that the content of Mg in the electrolytic solution was the same as the content at the time of preparing the electrolytic solution.

(Nail Piercing Test)

First, the prepared lithium ion secondary battery was charged with electricity. Charging was performed by constant current charging at a charging rate of 1.0 C (current value at which charging is completed in 1 hour when constant current charging is performed at 25° C.) until a battery voltage reaches 4.4 V. Furthermore, a nail having a diameter of 2.5 min was pierced into the charged battery at a speed of 150 mm/s and a nail piercing test was conducted.

The nail piercing test was performed on each of the 10 cells to determine a percentage of cells which did not ignite. A passing probability E of the nail piercing test was calculated by E="number of cells which did not ignite"/10×100.

Examples 2 to 9

Examples 2 to 9 are different from Example 1 in that at least one of an imide salt added to an electrolytic solution and a first element contained in a negative electrode active material was changed. As for other conditions, a pass rate E of the nail piercing test was obtained in the same manner as in Example 1. The results are summarized in Table 1.

Examples 10 to 14

Examples 10 to 14 are different from Example 1 in that a Li salt concentration in an electrolytic solution and an imide salt concentration of a first element were changed. In each of Examples 10 to 14, the imide salt concentration of the first element was adjusted to 10% with respect to the Li salt concentration in the electrolytic solution. As for other conditions, a pass rate E of the nail piercing test was obtained in the same manner as in Example 1. The results are summarized in Table 1.

Examples 15 to 20

Examples 15 to 20 are different from Example 1 in that a Li salt concentration in an electrolytic solution was fixed and an imide salt concentration of a list element was changed. As for other conditions, a pass rate E of a nail piercing test was obtained in the same manner as in Example 1. The results are summarized in Table 1.

Examples 21 to 24

Examples 21 to 24 are different from Example 1 in that an imide salt added to an electrolytic solution and a first element contained in a negative electrode active material were changed. In Examples 21 to 24, the first element contained in the imide salt and the first element contained in the negative electrode active material were both two or more kinds. As for other conditions, a pass rate E of a nail piercing test was obtained in the same manner as in Example 1. The results are summarized in Table 2.

Examples 25 to 31

Examples 25 to 31 are different from Example 1 in that a particle size of a negative electrode active material was changed. As for other conditions, a pass rate E of a nail piercing test was obtained in the same manner as in Example 1. The results are summarized in Table 2.

Comparative Example 1

Comparative Example 1 is different front Example 1 in that magnesium oxide (compound containing first element) was not added when a negative electrode active material was prepared and an imide salt was not added to an electrolytic solution. As for other conditions, a pass rate E of a nail piercing test was obtained in the same manner as in Example 1. The results are summarized in Table 2.

Comparative Example 2

Comparative Example 2 is different front Example 1 in that an imide salt was not added to an electrolytic solution. As for other conditions, a pass rate E of a nail piercing test was obtained in the same manner as in Example 1. The results are summarized in Table 2.

Comparative Example 3

Comparative Example 3 is different from Example 1 in that magnesium oxide (compound containing first element) was not added when a negative electrode active material was prepared. As for other conditions, a pass rate E of a nail piercing test was obtained in the same manner as in Example 1. The results are summarized in Table 2.

Comparative Example 4

Comparative Example 4 is different from Example 1 in that silicon was used instead of silicon oxide at the time of preparing a negative electrode active material. As for other conditions, a pass rate E of a nail piercing test was obtained in the same manner as in Example 1. The results are summarized in Table 2.

Comparative Example 5

Comparative Example 5 is different from Example 1 in that a composite of silicon and carbon is used instead of silicon oxide at the time of preparing a negative electrode active material. As for other conditions, a pass rate E of a nail piercing test was obtained in the same manner as in Example 1. The results are summarized in Table 2.

In Examples 1 to 31, the pass rate of the nail piercing test was higher than that in Comparative Examples 1 to 3. That is to say, the lithium ion secondary batteries according to Examples 1 to 31 in which the negative electrode active material contains the compound containing the first element and the electrolytic solution contains the imide salt of the first element had excellent safety.

TABLE 1

| | Negative electrode active material | | | | Electrolytic solution | | Imide salt | Nail piercing test |
| --- | --- | --- | --- | --- | --- | --- | --- | --- |
| | Core material | Particle size (μm) | First element | Imide salt | Li salt concentration (mol/L) | Imide salt concentration (mol/L) | concentration/Li salt concentration (%) | Pass rate E (%) |
| Example 1 | $SiO_X$ | 3 | Mg | $Mg(TFSI)_2$ | 1.0 | 0.1 | 10 | 90 |
| Example 2 | $SiO_X$ | 3 | Mg | $Mg(FSI)_2$ | 1.0 | 0.1 | 10 | 90 |
| Example 3 | $SiO_X$ | 3 | Mg | $Mg(BETI)_2$ | 1.0 | 0.1 | 10 | 90 |
| Example 4 | $SiO_X$ | 3 | Ca | $Ca(TFSI)_2$ | 1.0 | 0.1 | 10 | 90 |
| Example 5 | $SiO_X$ | 3 | Cs | $Cs(TFSI)_2$ | 1.0 | 0.1 | 10 | 80 |
| Example 6 | $SiO_X$ | 3 | Al | $Al(TFSI)_3$ | 1.0 | 0.1 | 10 | 80 |
| Example 7 | $SiO_X$ | 3 | Zn | $Zn(TFSI)_2$ | 1.0 | 0.1 | 10 | 80 |
| Example 8 | $SiO_X$ | 3 | Na | NaFSI | 1.0 | 0.1 | 10 | 50 |
| Example 9 | $SiO_X$ | 3 | K | KFSI | 1.0 | 0.1 | 10 | 50 |
| Example 10 | $SiO_X$ | 3 | Mg | $Mg(TFSI)_2$ | 0.8 | 0.08 | 10 | 80 |
| Example 11 | $SiO_X$ | 3 | Mg | $Mg(TFSI)_2$ | 1.1 | 0.11 | 10 | 100 |
| Example 12 | $SiO_X$ | 3 | Mg | $Mg(TFSI)_2$ | 2.0 | 0.20 | 10 | 90 |
| Example 13 | $SiO_X$ | 3 | Mg | $Mg(TFSI)_2$ | 3.8 | 0.38 | 10 | 80 |
| Example 14 | $SiO_X$ | 3 | Mg | $Mg(TFSI)_2$ | 4.5 | 0.45 | 10 | 70 |
| Example 15 | $SiO_X$ | 3 | Mg | $Mg(TFSI)_2$ | 1.0 | 0.01 | 1 | 50 |
| Example 16 | $SiO_X$ | 3 | Mg | $Mg(TFSI)_2$ | 1.0 | 0.03 | 3 | 70 |
| Example 17 | $SiO_X$ | 3 | Mg | $Mg(TFSI)_2$ | 1.0 | 0.06 | 6 | 100 |
| Example 18 | $SiO_X$ | 3 | Mg | $Mg(TFSI)_2$ | 1.0 | 0.18 | 18 | 90 |
| Example 19 | $SiO_X$ | 3 | Mg | $Mg(TFSI)_2$ | 1.0 | 0.24 | 24 | 60 |
| Example 20 | $SiO_X$ | 3 | Mg | $Mg(TFSI)_2$ | 1.0 | 0.30 | 30 | 60 |

TABLE 2

| | Negative electrode active material | | | | Electrolytic solution | | Imide salt | Nail piercing test |
| --- | --- | --- | --- | --- | --- | --- | --- | --- |
| | Core material | Particle size (μm) | First element | Imide salt | Li salt concentration (mol/L) | Imide salt concentration (mol/L) | concentration/Li salt concentration (%) | Pass rate E (%) |
| Example 21 | $SiO_X$ | 3 | Mg<br>Ca | $Mg(TFSI)_2$<br>$Ca(TFSI)_2$ | 1.0 | 0.1 | 10 | 100 |
| Example 22 | $SiO_X$ | 3 | Mg<br>Al | $Mg(TFSI)_2$<br>$Al(TFSI)_3$ | 1.0 | 0.1 | 10 | 100 |
| Example 23 | $SiO_X$ | 3 | Mg<br>Zn | $Mg(TFSI)_2$<br>$Zn(TFSI)_2$ | 1.0 | 0.1 | 10 | 100 |
| Example 24 | $SiO_X$ | 3 | Mg<br>Ca<br>Al | $Mg(TFSI)_2$<br>$Ca(TFSI)_2$<br>$Al(TFSI)_3$ | 1.0 | 0.1 | 10 | 100 |
| Example 25 | $SiO_X$ | 0.2 | Mg | $Mg(TFSI)_2$ | 1.0 | 0.1 | 10 | 60 |
| Example 26 | $SiO_X$ | 0.8 | Mg | $Mg(TFSI)_2$ | 1.0 | 0.1 | 10 | 70 |
| Example 27 | $SiO_X$ | 1.2 | Mg | $Mg(TFSI)_2$ | 1.0 | 0.1 | 10 | 100 |
| Example 28 | $SiO_X$ | 4.6 | Mg | $Mg(TFSI)_2$ | 1.0 | 0.1 | 10 | 90 |
| Example 29 | $SiO_X$ | 8 | Mg | $Mg(TFSI)_2$ | 1.0 | 0.1 | 10 | 90 |
| Example 30 | $SiO_X$ | 12 | Mg | $Mg(TFSI)_2$ | 1.0 | 0.1 | 10 | 80 |
| Example 31 | $SiO_X$ | 18 | Mg | $Mg(TFSI)_2$ | 1.0 | 0.1 | 10 | 70 |
| Comparative Example 1 | $SiO_X$ | 3 | — | — | 1.0 | — | — | 30 |
| Comparative Example 2 | $SiO_X$ | 3 | Mg | — | 1.0 | — | — | 40 |

TABLE 2-continued

| | Negative electrode active material | | | Electrolytic solution | | | | Nail piercing test |
| | Core material | Particle size (μm) | First element | Imide salt | Li salt concentration (mol/L) | Imide salt concentration (mol/L) | Imide salt concentration/Li salt concentration (%) | Pass rate E (%) |
|---|---|---|---|---|---|---|---|---|
| Comparative Example 3 | $SiO_X$ | 3 | — | $Mg(TFSI)_2$ | 1.0 | 0.1 | 10 | 40 |
| Comparative Example 4 | Si | 3 | Mg | $Mg(TFSI)_2$ | 1.0 | 0.1 | 10 | 30 |
| Comparative Example 5 | SiC | 3 | Mg | $Mg(TFSI)_2$ | 1.0 | 0.1 | 10 | 40 |

Explanation of References

10 Separator
20 Positive electrode
22 Positive electrode current collector
24 The positive electrode active material layer
30 Negative electrode
32 Negative electrode current collector
34 Negative electrode active material layer
35 Negative electrode active material
36 Core
37 Coating layer
37A First layer
37B Second layer
40 Power generation element
50 Exterior body
52 Metal foil
54 Resin layer
60, 62 Terminal
100 Lithium ion secondary battery

What is claimed is:

1. A lithium ion secondary battery comprising:
a positive electrode;
a negative electrode;
a separator located between the positive electrode and the negative electrode; and
an electrolytic solution, wherein
the negative electrode includes a negative electrode active material which contains silicon oxide and a compound containing a first element,
the electrolytic solution contains a non-aqueous solvent and an imide salt which contains the first element and an imide anion, and
the first element is any one or more elements selected from the group consisting of K, Na, Mg, Ca, Cs, Al, and Zn.

2. The lithium ion secondary battery according to claim 1, wherein a molarity proportion of the imide salt containing the first element in the electrolytic solution is 5% or more and 20% or less with respect to a molarity proportion of the lithium salt in the electrolytic solution.

3. The lithium ion secondary battery according to claim 1, wherein the compound containing the first element is at least one selected from the group consisting of fluoride, oxide, silicide, silicon oxide, and phosphorus oxide.

4. The lithium ion secondary battery according to claim 1, wherein the negative electrode active material includes a core and a coating layer with which the core is coated, and
the coating layer contains the compound containing the first element.

5. The lithium ion secondary battery according to claim 1, wherein the silicon oxide is represented by $SiO_x$ and x satisfies $0.8 \leq x \leq 2$.

6. The lithium ion secondary battery according to claim 1, wherein
a median diameter (D50) of the negative electrode active material is 1 μm or more and 10 μm or less.

7. The lithium ion secondary battery according to claim 1, wherein
the first element in the negative electrode active material and the first element in the electrolytic solution are the same.

* * * * *